(12) United States Patent
Aversano et al.

(10) Patent No.: US 11,269,889 B1
(45) Date of Patent: Mar. 8, 2022

(54) GRAPHICAL USER INTERFACE DRIVEN PROGRAMMING DEVELOPMENT ENVIRONMENT

(71) Applicants: Christopher James Aversano, Smyrna, GA (US); Tomasz Jan Stachowiak, Marietta, GA (US)

(72) Inventors: Christopher James Aversano, Smyrna, GA (US); Tomasz Jan Stachowiak, Marietta, GA (US)

( * ) Notice: Subject to any disclaimer, the term of this patent is extended or adjusted under 35 U.S.C. 154(b) by 321 days.

(21) Appl. No.: 16/373,870

(22) Filed: Apr. 3, 2019

Related U.S. Application Data

(60) Provisional application No. 62/669,078, filed on May 9, 2018.

(51) Int. Cl.
| | |
|---|---|
| *G06F 16/24* | (2019.01) |
| *G06F 16/2457* | (2019.01) |
| *G06F 16/23* | (2019.01) |
| *G06F 16/2458* | (2019.01) |
| *G06F 9/455* | (2018.01) |
| *G06F 9/30* | (2018.01) |
| *G06F 9/38* | (2018.01) |
| *G06F 9/48* | (2006.01) |
| *G06F 8/34* | (2018.01) |
| *G06F 9/54* | (2006.01) |

(52) U.S. Cl.
CPC .......... *G06F 16/24573* (2019.01); *G06F 8/34* (2013.01); *G06F 9/30029* (2013.01); *G06F 9/3838* (2013.01); *G06F 9/45558* (2013.01); *G06F 9/4806* (2013.01); *G06F 16/23* (2019.01); *G06F 16/2458* (2019.01); *G06F 9/541* (2013.01); *G06F 2009/4557* (2013.01)

(58) Field of Classification Search
CPC .......... G06F 16/24573; G06F 16/2458; G06F 16/23; G06F 8/34; G06F 9/30029; G06F 9/3838; G06F 9/45558; G06F 9/4806; G06F 9/541
See application file for complete search history.

(56) References Cited

U.S. PATENT DOCUMENTS 7,461,077 B1 * 12/2008 Greenwood .......... G06F 3/0482
8,239,840 B1 * 8/2012 Czymontek ............... G06F 8/34
717/135

(Continued)

*Primary Examiner* — Kris E Mackes
*Assistant Examiner* — Tiffany Thuy Bui
(74) *Attorney, Agent, or Firm* — John Rizvi; John Rizvi, P.A.—The Patent Professor®

(57) ABSTRACT

Data structures and applications are defined with the point-and-click visual tools or speech recognition and recorded as metadata descriptions, which are converted at runtime to generate underlying software code (e.g., C #, SQL, JavaScript, etc.) to implement the application. The data structures include application data elements described in a data serialization format, such as JSON, are stored in a NoSQL database. Each application data element includes fields that each represent an individual value. Each field is defined with a label, a data type, and attributes. The data structures also describe relationships or links between application data elements, as well as data-driven or time-based rules that drive further data manipulation and interactions within and external to the programming development environment through a variety of interfaces (e.g. HTTP, SMTP, SMS).

10 Claims, 12 Drawing Sheets

(56) References Cited

U.S. PATENT DOCUMENTS

| | | | | |
|---|---|---|---|---|
| 9,552,123 | B1* | 1/2017 | Johnston | G06F 9/451 |
| 2006/0225032 | A1* | 10/2006 | Klerk | G06F 8/10 |
| | | | | 717/105 |
| 2007/0239648 | A1* | 10/2007 | Thota | G06F 40/143 |
| | | | | 706/47 |
| 2011/0119652 | A1* | 5/2011 | Yu | G06F 9/4488 |
| | | | | 717/108 |
| 2015/0135160 | A1* | 5/2015 | Gauvin | G06F 8/71 |
| | | | | 717/109 |
| 2017/0115968 | A1* | 4/2017 | Fukala | G06F 16/252 |
| 2018/0004782 | A1* | 1/2018 | Greenwood | G06F 16/213 |
| 2019/0347341 | A1* | 11/2019 | Carr | G06F 16/2246 |

* cited by examiner

GRAPHICAL USER INTERFACE DRIVEN PROGRAMMING DEVELOPMENT ENVIRONMENT

CROSS-REFERENCE TO RELATED APPLICATION

This application claims the benefit of U.S. Provisional Patent Application Ser. No. 62/669,078, filed May 9, 2018, which is incorporated herein in its entirety.

FIELD OF THE INVENTION

The present invention relates generally to computer technology, and more particularly, to a practical improvement to computing technology that greatly improves application development systems.

BACKGROUND OF THE INVENTION

Typically, software applications need to be developed for businesses. For example, existing enterprise applications require software development activities to automate sophisticated business processes. In order to perform these activities extensive computer programming expertise is required including a deep understanding of programming languages (e.g. C, Java, JavaScript) syntax and semantics, data structures, and processing algorithms.

However, individuals or groups of individuals may not have the technical ability, skill, knowledge, or programming expertise to develop software applications. Therefore, businesses or enterprises require hiring employees or individuals who are talented and skilled in this highly necessary and valuable technological development process. Such individuals are typically hard to find and demand an extremely high salary, resulting in significant financial losses for a business.

SUMMARY OF THE INVENTION

This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various aspects of the disclosure provide a graphical user interface-based application development environment. The application development environment comprises a metadata database configured to store an application data element in a data serialization format, wherein the application data element comprises a plurality of data fields that each represent an individual value, wherein each data field has a label, a data type, and one or more attributes. The application development environment also comprises a web service configured to receive an updated value for a data element.

The web service is further configured to retrieve the application data element from the metadata database based on the data element corresponding to a first data field of the plurality of data fields. The web service is further configured to parse the application data element to update a value of the first data field with the updated value of the data element. The application development environment further comprises a relational database of user data configured to store the data element in a table, wherein the web service is configured to automatically generate an update statement to update the data element in the table with the updated value.

In some aspects of the disclosure, a second data field of the plurality of data fields has an attribute that is an expression that references the first data field for calculating a value of the second data field. The web service is further configured to dynamically arrange software code to calculate a value of the second data field as specified in the expression based on the updated value of the first data field. The expression references application data element fields and uses one or more mathematical formulas, mathematical operators, logical functions, data evaluation functions, or aggregate formulas across application data elements to calculate the value of the second data field.

In some aspects of the disclosure, the data serialization format is one of JSON, YAML, BSON, or XML. The metadata database is an NoSQL database.

Another aspect of the disclosure is an application development environment that comprises a metadata database configured to store a rule. The rule comprises an identification of a triggering application data element, one or more conditions for implementation of the rule, and one or more actions to execute upon satisfying the one or more conditions. Each of the actions comprises action properties with references to fields of one or more application data elements in the metadata database. Each of the conditions comprising an evaluation of a condition value by an operator to a value of a field of the triggering application data element. The application development environment also comprises an event bus configured to receive a data event of an updated application data element. The application development environment also comprises a rule handler configured to receive the data event from the event bus, wherein the rule handler is configured to retrieve the rule from the metadata database based on the updated application data element being the triggering application data element.

In some aspects of the disclosure, the rule handler is further configured to parse the rule and generate a software code object hierarchy for implementation of the rule, wherein the software code object hierarchy references one or more pre-compiled methods of software code.

In some aspects of the disclosure, the event bus is configured to distribute the event to the rule handler using a load balancing algorithm.

In some aspects of the disclosure, each of the of one or more application data elements comprises a plurality of data fields that each represent an individual value, wherein each data field has a label, a data type, and one or more attributes.

These and other features will be more clearly understood from the following detailed description taken in conjunction with the accompanying drawings and claims.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
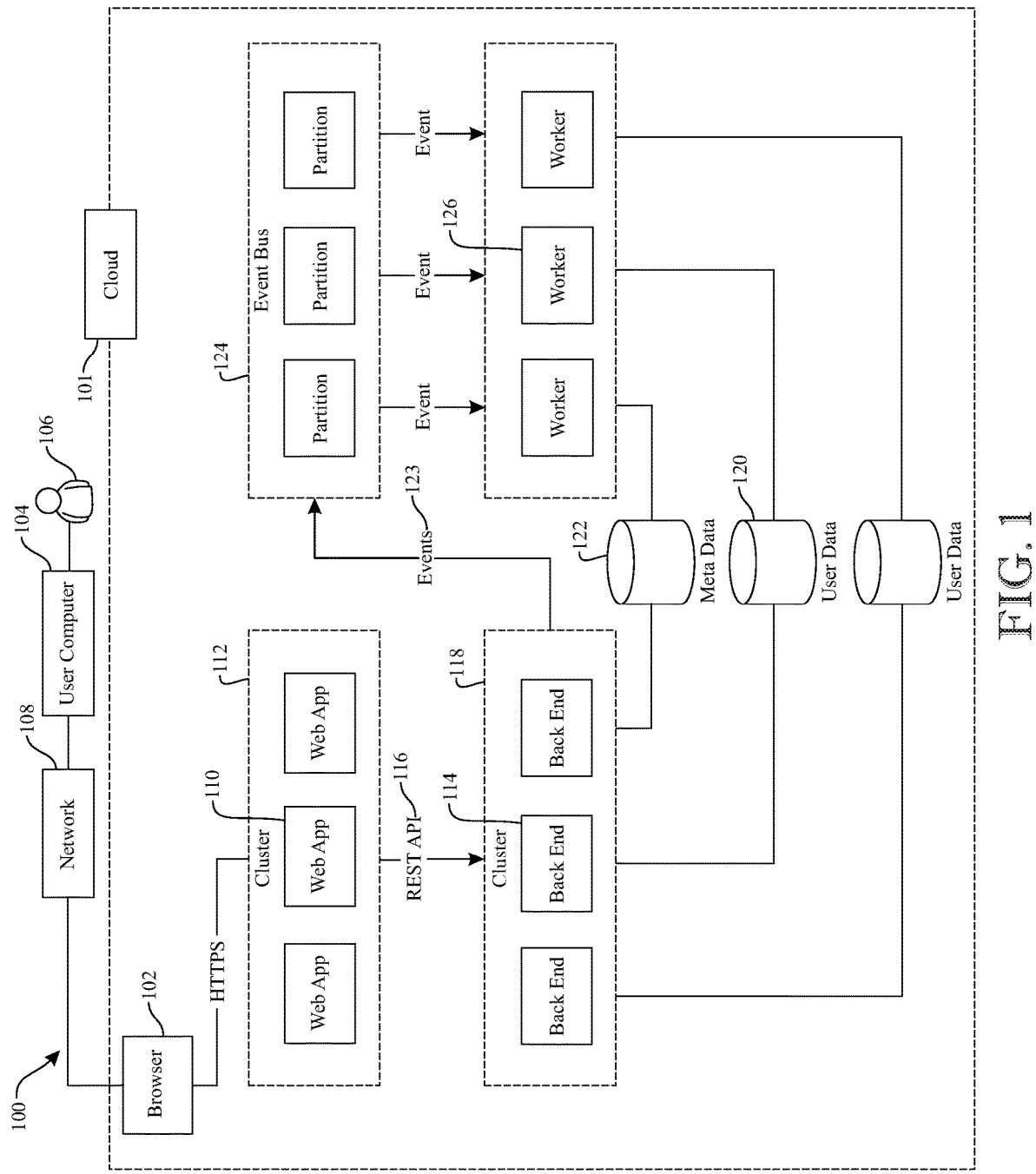
FIG. 1 illustrates a physical architecture of a programming development environment according to one implementation.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A, B, and/or C" means "A", or "B", or "C", or "A and B", or "A and C", or "A and B and C". In other words, A, B, and/or C means A, B, or C alone, or any combination thereof.

The programming development environment disclosed herein allows business process owners or other non-expert users without expertise in programming languages (e.g. C, Java, JavaScript) syntax and semantics, data structures, and processing algorithms to design their own data structures and applications using intuitive point-and-click visual tools and other natural user interfaces such as speech recognition. The data structures and applications defined with the point-and-click visual tools are recorded in Metadata descriptions, which are converted at runtime to generate underlying software code (e.g., C #, SQL, JavaScript, etc.) to implement the application.

The programming development environment facilitates defining new application data elements through a graphical user interface. The programming development environment generates Metadata descriptions of the structure of application data elements that are stored in a dedicated repository with user specified attributes. The application data elements include fields that each represent an individual value. Each field is defined with a label (e.g., an alphanumeric description of the field), a data type (e.g., text, integer, currency, identifier, etc.) and attributes. The attributes may specify an initial value of a field, define a validation condition for data entered into the field, define an expression for dynamically calculating the value of the field, and/or indicate whether the field is a required field for the application data element, for example.

The values held in each field may include one or more of a static value, a user-entered value, or an expression value. At runtime, a web service evaluates the expression and converts the Metadata to dynamically arranged software code (C #, SQL, JavaScript) maintained by the web service that manages data and performs functions specified in the expressions in a fully automated fashion to calculate the expression value.

In addition to describing the structure of application data elements, the Metadata is also used to describe relationships or links between application data elements, as well as data-driven or time-based rules that drive further data manipulation and interactions within and external to the programming development environment through a variety of interfaces (e.g. HTTP, SMTP, SMS). The Metadata may also define reports and workflows.

As data is generated, manipulated, or updated, data-driven events are published to an event bus. Time-based events may also be published to the event bus upon meeting a time condition. Using a conventional load balancing algorithm, the events are distributed to a Rule Handler executing on an event processor. The Rule Handler retrieves Metadata structures specifying rules/behavior to be triggered by a specific type of event. As with the expressions, the Rule Handler evaluates the retrieved Metadata and automatically generates software code maintained by the Rule Handler (C #, SQL, JavaScript) at runtime that manages data and performs functions specified in the rule in a fully automated fashion.

The Metadata driven approach facilitates automatic generation of programming code at runtime through non-expert user defined data structures and applications using intuitive point-and-click visual tools and other natural user interfaces. Because the applications are defined through Metadata descriptions, as opposed to through the underlying software code, applications can be generated or modified quickly to meet evolving business needs without going through the typical software deployment processes (compilation, linking, installation, configuration). The Metadata driven approach allows easy copying and sharing of entire applications. It also enables creating a marketplace-like environments where applications can be exchanged, sold, and purchased. With generic, highly customizable APIs, applications can integrate with third-party systems and hosted environments. In combination with metadata-driven rules engine it allows the creation of sophisticated business flows across the entire enterprise value chain.

The illustration of FIG. 1 illustrates a physical architecture of a programming development environment 100 according to one implementation. As shown in FIG. 1, the programming development environment 100 is a web-based environment. In some implementations, a local installation of the programming development environment 100 on a user computer may be performed.

The programming development environment 100 is accessible over a network 108 by a user 106 through a web browser 102 installed on a local user computer 104. While the web browser 102 is shown within a cloud environment 101 of the programming development environment 100, the web browser 102 is executed remote from the cloud environment 101 and accesses the cloud environment 101 through any appropriate network communications protocol, such as hypertext transfer protocol (HTTP), or the like. For example, the user 106 may navigate to a website using the web browser 102 and log in to the programming development environment 100. A web application 110, which may be one of a cluster of web applications 112 serving the programming development environment 100, communicates graphical user interfaces (GUIs) to the web browser 102 to facilitate interaction between the user 106 and the programming development environment 100, as described in detail below.

The web application 110 communicates with a web service 114 via a representational state transfer (REST) application programming interface (API) 116. The web service 114 may be one of a cluster of web services 118 serving the programming development environment 100. In response to requests received by the web application 110 to access (e.g., retrieve or update) user data stored in a user database 120, the web service 118 requests access to the user data through the REST API 116. The user database 120 may be a structured query language (SQL) database or other such relational database. Other types of databases may be used to store user data, such as object-oriented databases (OODB), object-relational databases (ORD), or the like. Regardless of the type of database used, the REST API 116 abstracts the complexity of the underlying data structures and relationships of the user database 120. The database 120 may be implemented as a database server.

Figure 1A:
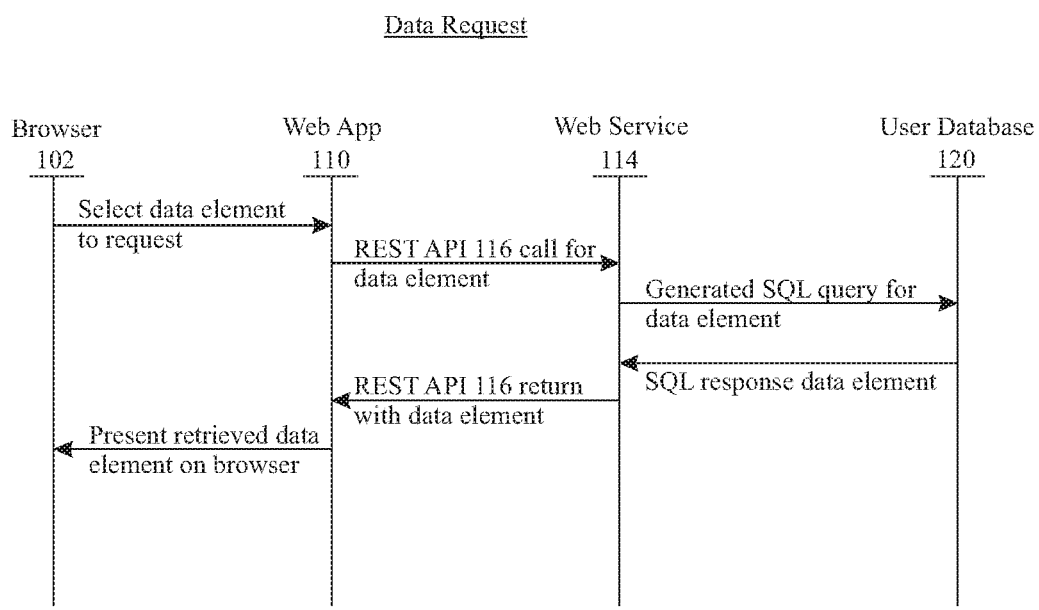
FIG. 1A illustrates a sequence diagram for a data request process in the programming development environment according to one implementation.

Upon receiving a request to access a data element in the user database 120 through the REST API 116, the web service 114 automatically generates one or more database queries, such as SQL queries, based on data elements requested and additional search criteria. See, for example, FIG. 1A. For example, the web service 114 retrieves metadata structure(s) that correspond to the requested data element from a metadata database 122. As described in more detail below, the metadata structure is parsed to create a hierarchy of objects, where each object belongs to a code element, such as a SQL statement or query, that defines the object's structure and behavior for retrieving or updating the data element from the user database 120. The web service 114 communicates the generated database queries to the user database 120 to retrieve the desired data element. The retrieved data element is then communicated back through the REST API 116 to the web application 110 and presented via a user interface on the browser 102.

Figure 1B:
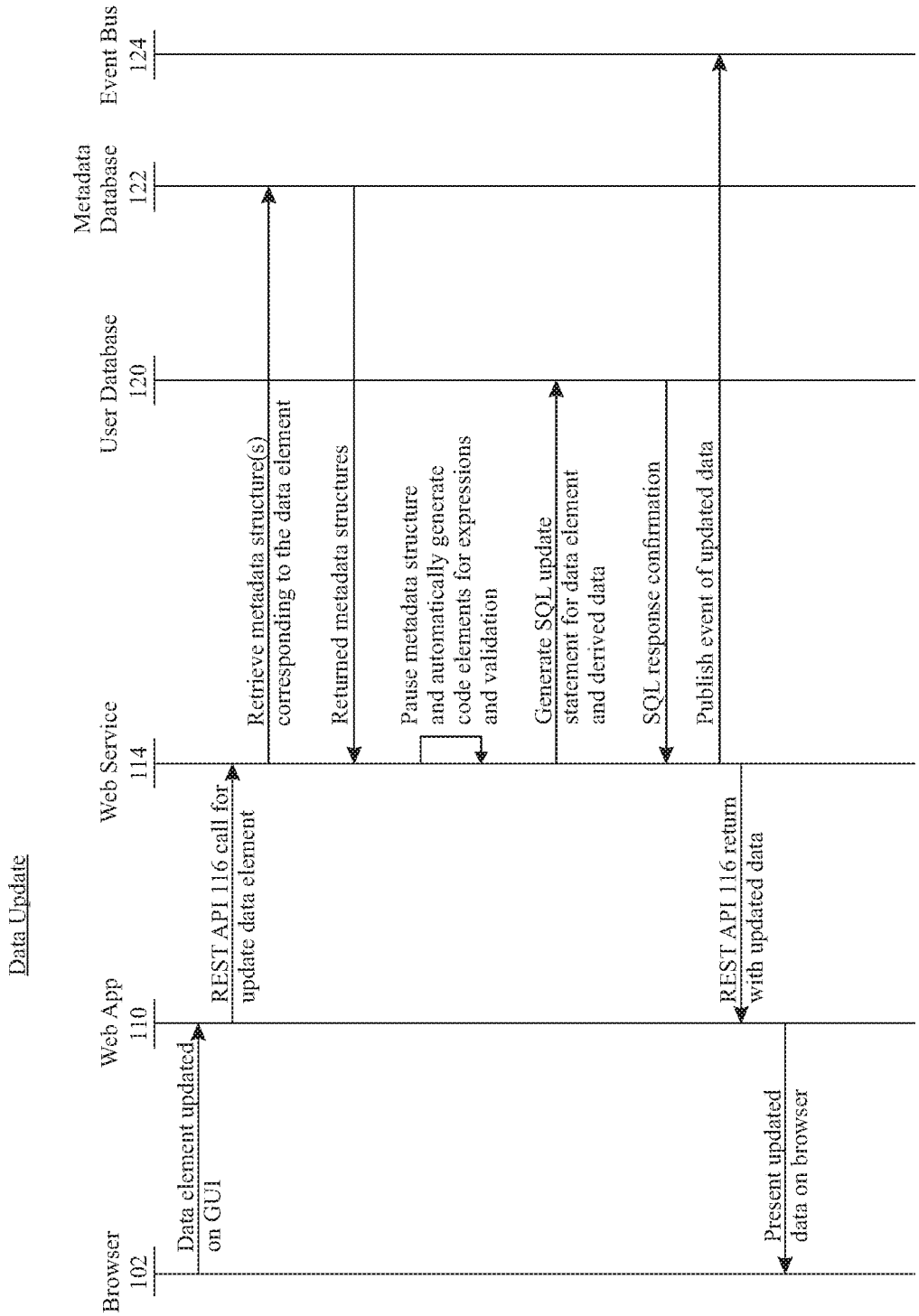
FIG. 1B illustrates a sequence diagram for a data update process in the programming development environment according to one implementation.

Through interaction with a GUI displayed by the browser 102, the user 106 may update a data element. See, for example, FIG. 1B. The updated data element is received by the web application 110, which in turn generates a REST API 116 call to the web service 114 to update the data element. The web service 114 retrieves metadata structure(s) that correspond to the updated data element from a metadata database 122. For example, one or more fields of one or more application data elements may be specified with the updated data element. The metadata database 122 may be a NoSQL database, such as a document database, a graph store, a key-value store, a wide-column store, or other such NoSQL databases. In some implementations, the NoSQL database is a document database and the metadata is a JavaScript Object Notation (JSON) string. In other implementations, other data serialization formats may be used besides JSON, such as YAML Ain't Markup Language (YAML), binary JSON (BSON), extensible markup language (XML), or the like.

The metadata database 122 returns metadata structures associated with the updated data element. The returned metadata structures may include an application data element structure. The application data element defines a static structure of fields that each represent an individual value (e.g., the fields of the application data element remain fixed, but the values held by the fields may change over time). Each field is defined with a label, a data type (e.g., text, integer, currency, identifier, etc.), and attributes. Other data types may be used, including decimal, currency, percentage, date, DateTime, Boolean, document (attachment), image (attachment), list (preset values to select from), or comment (longer text). The label is a text and/or numeric string for identifying the field in the application data element. The attributes may specify an initial value of a field, define a validation condition for data entered into the field, define an expression for dynamically calculating the value of the field, and/or indicate whether the field is a required field for the application data element, for example. The initial value and validation condition may also be defined through an expression. As described in more detail below, expressions reference application data element fields and use mathematical formulas, common mathematical operators (e.g., add, subtract, divide, multiply, etc.), logical functions (e.g., AND, OR, etc.), data evaluation functions (e.g., text, date, or financial manipulation functions), and/or aggregate formulas on all child application data elements (e.g., sum, average, standard deviation, etc.) to calculate values.

The values held in each field may include one or more of a static value, an entered value (e.g., through entry by way of a GUI on the browser 102), or an expression value. At runtime, the web service 114 evaluates the expression and converts the Metadata to dynamically arranged software code (C #, SQL, JavaScript) maintained by the web service 114 that manages data and performs functions specified in the expressions in a fully automated fashion to calculate the expression value.

Upon receiving the returned application data element associated with the updated data element from the metadata database 122, the web service 114 parses the metadata structure and updates a value of a field corresponding to the updated data element. Based on the parsed metadata structure, the web service 114 automatically generates code elements for evaluating expressions (e.g., generating an initial value, a dynamically calculated value, or evaluating a validation condition for an entered value) based on the updated field value corresponding to the updated data element. Such evaluations include the generation of derived data values based on the updated data value as well as validating data submitted by the user 106.

At runtime relevant portions of Metadata are retrieved and its JSON structure is parsed creating a hierarchy of objects. Each object belongs to a code element, such as a C # class, a SQL statement or query, JavaScript code, etc., that defines the object's structure and behavior. A class used for a particular JSON element is chosen based on a position in the JSON structure, name of a property, and optionally a special "_t" parameter.

Upon implementing the code elements to evaluate expression(s) of the web service 114 generates SQL update statement(s) for updated data values, including the updated data element and any derived data elements based on the updated data element. The SQL update statement(s) are communicated by the Web service 114 to the user database 120 to update the data elements and confirmation(s) from the user database 120 are received in response.

A data-driven event 123 with the updated value(s) is generated by the web service 114 and submitted to an event bus 124. The updated value and any derived values are also communicated back through the REST API 116 to the web application 110 and presented via a user interface on the browser 102. The event 123 includes information about an application data element being updated, such as a name of the application data element, a unique identifier of the application data element, and new field values. The event 123 in this example includes the updated field value of the application data element corresponding to the updated data element as well as any derived field values of application data element(s) generated based on the updated field value.

The event bus 124 distributes the event 123 to one of a plurality of event processing engines (running on a cluster of dedicated virtual machines) using a standard load balancing algorithm. A process executed by the event processing engines to process the event is called a Rule Handler 126, described in more detail below. While the event 123 described in the present example relates to a data-driven event, all events of the programming development environment 100 are posted to the event bus 124, as described in more detail below.

Figure 1C:
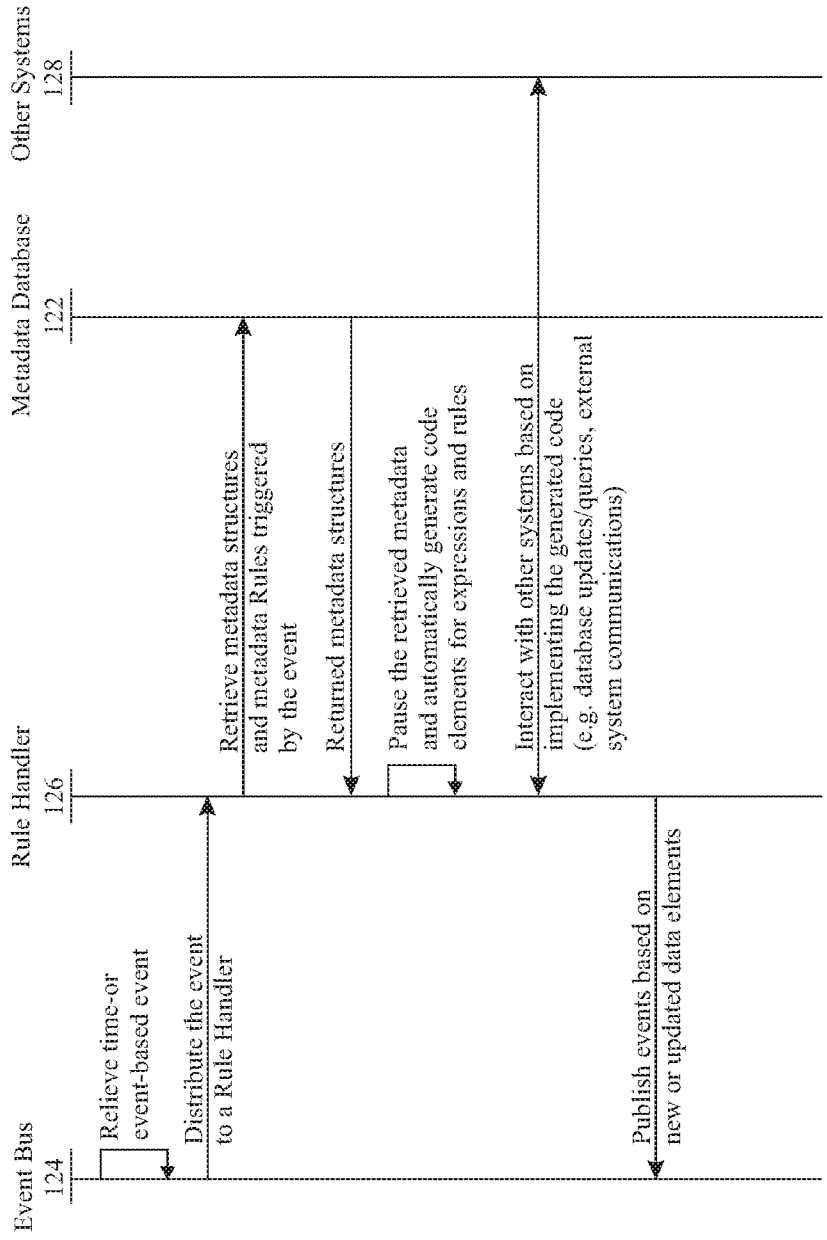
FIG. 1C illustrates a sequence diagram for an event handling process in the programming development environment according to one implementation.

As events are received by the event bus 124, the events are processed. See, for example, FIG. 1C. The events may include time- or data-based events. As events are received by the event bus 124, they are distributed to a Rule Handler 126 for processing. The Rule Handler 126 retrieves metadata structures from the metadata database 122 that correspond to the event. The metadata structures may include application data element(s), rules, workflows, and/or reports, described in more detail below. The metadata database 122 returns the metadata structures from the metadata database 122 to the Rule Handler 126.

Upon receiving the returned metadata structures associated with the event from the metadata database 122, the Rule Handler 126 parses the metadata structure(s). Based on the parsed metadata structure(s), the Rule Handler 126 automatically generates code elements to manage data and implement functions described in the retrieved metadata structure(s). The code elements may be maintained by the Rule Handler 126. For example, the code elements may apply conditions and translations to the event to producing new data elements, retrieve additional data and/or perform database updates from the user database 120 using dynamically generated SQL statements, and/or the code elements may communicate with external systems and submit dynamically generated requests (e.g. Web APIs, email servers), among other features. Additional events based on new or updated data elements generated by the execution of the code elements are published to the event bus 124 by the Rule Handler 126.

Figure 2:
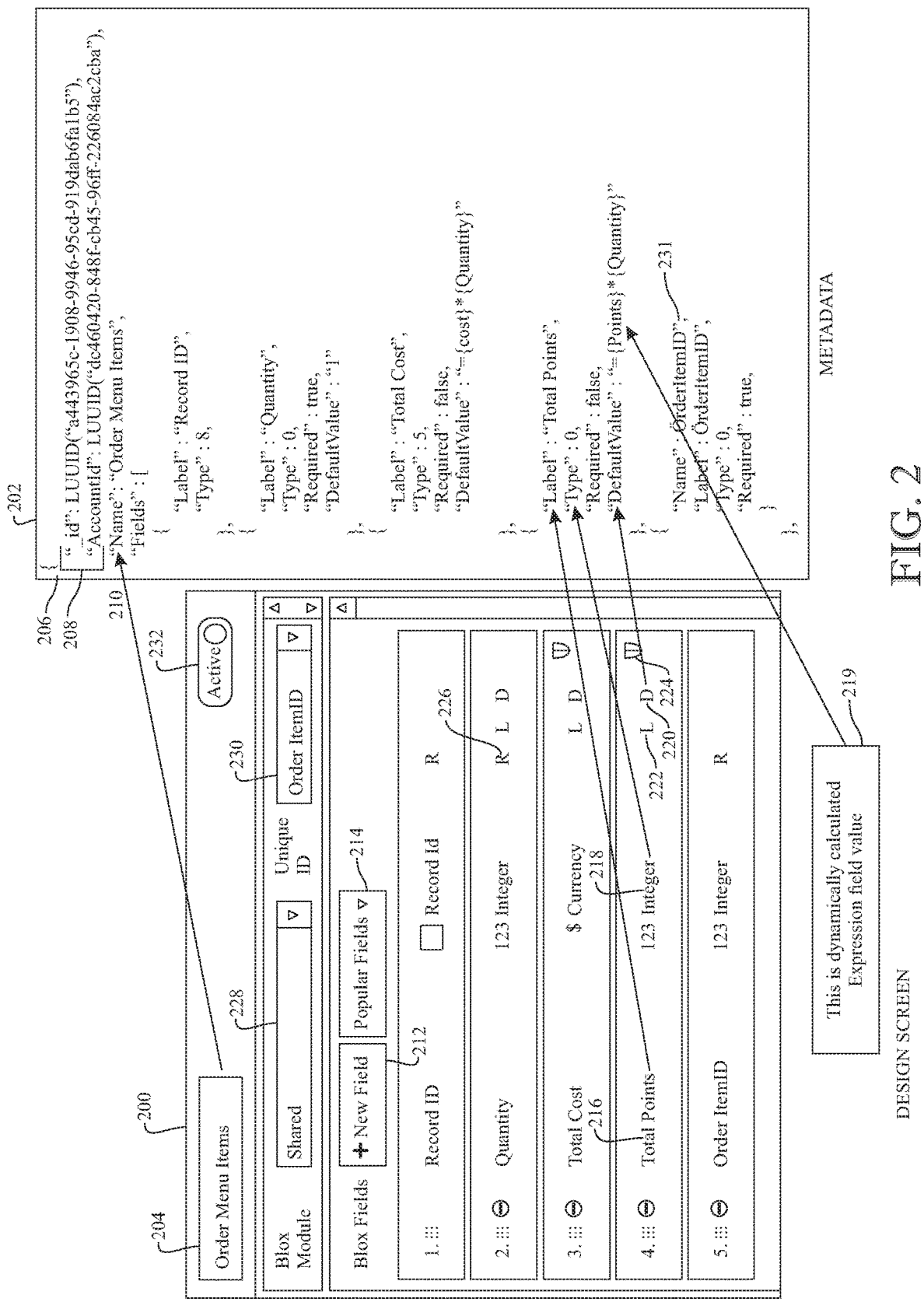
FIG. 2 illustrates an example graphical user interface for defining an application data element and corresponding metadata generated as a result according to one implementation.

The illustration of FIG. 2 illustrates an example graphical user interface (GUI) 200 for creating an application data element 202 and a corresponding metadata structure generated as a result according to one implementation. After the user 106 logs in to the programming development environment 100 via the browser 102, the web application 110 may receive a selection to create the new application data element 202. In response to the selection to create the new application data element 202, the web application 110 provides the GUI 200 to the web browser 102 to facilitate the user 106 to create the new application data element 202. The user 106 interacts with the GUI 200 to provide input for how to structure the application data element 202. As the user 106 provides input through the web browser 102, the web application 110 generates a corresponding metadata structure for the application data element 202.

In the example shown in FIG. 2, the GUI 200 receives an input for a name 204 of the application data element 202 to call it Order Menu Items. Accordingly, the web application 110 starts creating the metadata description of the application data element 202, a JSON string 206 in this example. The JSON string 206 includes identifiers 208 associated with an account to which the user 106 logged into when accessing the programming development environment 100.

The GUI 200 additionally receives input to add new fields to the application data element 202 through selection of a New Field button 212 or a Popular Fields dropdown menu 214. Upon selection of the New Field button 212, a prompt is provided to the GUI 200 to define the new field, including a label (e.g., an alphanumeric description of the field), a data type (e.g., text, integer, currency, identifier, etc.), and attributes. The attributes may specify an initial value of a field, define a validation condition for data entered into the field, define an expression for dynamically calculating the value of the field, and/or indicate whether the field is a required field for the application data element, for example. Other attributes may be used for one or more of the fields. Upon the new field being defined, the metadata description of the field is added to the application data element 202.

For example, upon selecting the New Field button 212, a user may enter a label 216 of "Total Points", select a data type 218 of integer, and define an expression 219 for calculating a default value of the "Total Points" field. In this example, the expression is a mathematical expression for multiplying the values of two fields, {Points} and (Quantity). The (Quantity) field is a field of the current application data element 202 and the {Points} field is a field of another application data element that is linked to the current application data element 202 through the expression 219. Linking of application data elements is described in more detail below.

Based on the definition of the new field, the GUI 200 is updated to show the label 216, the data type 218 and attribute indicators. For example, a "D" indicator 220 shows that the field has a default value—in this example, the value calculated by the expression 219. An "L" indicator 222 shows that the field is linked to a field of another application data element—in this example, the Total Points field is linked to the application data element that maintains the (Points) field through the expression 219. A "carrot" indicator 224 shows that the field includes an expression—in this example, expression 219. Other attribute indicators may be shown. For example, for the Quantity field, an "R" indicator shows that the field is a required field.

In response to the definition of the fields of the application data element 202 through the GUI 200, the web application 110 updates the metadata description of the application data element 202 with the new field information, including a description of the label, data type, and attributes of each field. As shown in FIG. 2, the JSON string that provides the metadata description of the application data element 202 includes nested object notations of each of the fields of the application data element 202. For example, within the "Fields" parameter, the JSON string defines a parameter value of the Total Points field to include a nested object notation describing parameters and parameter values for each of the parts of the field. Accordingly, the Total Points field is described with a "Label" parameter with a parameter value of "Total Points", a "Type" parameter with a parameter value of O (which corresponds to an integer data type), a "Required" parameter with a parameter value of false, and a "DefaultValue" parameter with a parameter value of the expression 219 "=(Points)*{Quantity}".

The GUI 200 also includes a drop-down menu 228 for selecting whether or not the application data element 202 is a shared application data element. The GUI 200 additionally includes a drop-down menu 230 for selecting one of the fields of the application data element 202 to be a unique identifier of the application data element 202. In the example shown, the "Order ItemID" field is selected as the unique identifier for the application data element 202. Accordingly, the JSON string that provides the metadata description of the application data element 202 is updated by the web application 110 to include a "Name" parameter with a parameter value of "Order ItemID" in addition to the "Label" parameter for the Order ItemID field. The GUI 200 also includes a toggle selection 232 to activate or deactivate the Order Menu Items application data element 202.

Following the example described above with FIG. 1B, upon the creation of the metadata structure of the application data element 202, the web application 110 sends the application data element 202 to the web service 114 through the REST API 116 call. The web service 114 then stores the metadata structure of the application data element 202 in the metadata database 122.

Figure 3:
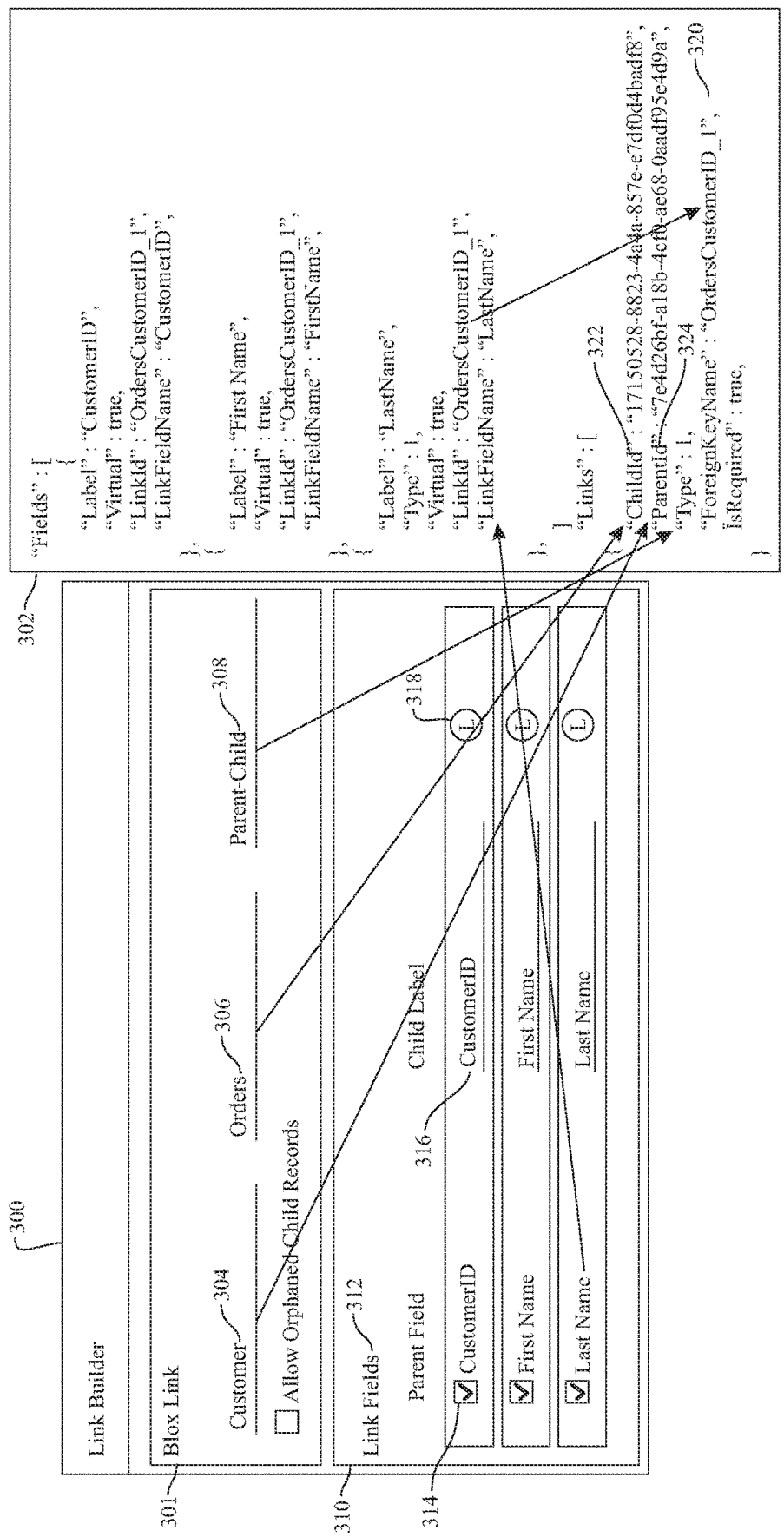
FIG. 3 illustrates an example graphical user interface for defining links between application data elements and corresponding metadata generated as a result according to one implementation.

The illustration of FIG. 3 illustrates an example GUI 300 for defining links between application data elements and a corresponding link metadata structure 302 generated as a result according to one implementation. The link metadata structure 302 represents hierarchical relationships between application data elements. Each link metadata structure 302 has a parent application data element and child application data element along with link cardinality (e.g., one-to-one, many-to-one, one-to-many, or many-to-many).

The GUI 300 includes a link section 301 for defining a link between two application data elements. The link section 301 includes a primary application data element field 304 and a secondary application data element field 306 as well as a link type field 308. In the example shown, the link type field 308 is a parent-child link, where the primary application data element field 304 is the parent field and the secondary application data element field 306 is a child field. Other types of links may be used. The links may form one-to-one, many-to-one, one-to-many, or many-to-many relationships among application data elements. The parent field 304 receives input through the GUI 300 to be assigned to a Customer application data element and the child field 306 receives input through the GUI 300 to be assigned to an Orders application data element.

Upon the parent field 304 being specified, a link fields section 310 is populated with fields 312 of the application data element specified in the parent field 304. Each of the fields 312 is listed with a selection box 314 for selecting whether to link the corresponding field to the application data element specified in the child field 306. If so, a label field 316 is populated through the GUI 300 to specify a label of the linked field in the child application data element. In the example shown, the label field 316 receives an input to label the linked field in the child application data element as CustomerID. While the label field 316 is the same as the parent field 314, a different label may be used in the child application data element. The GUI 300 is updated with the "L" indicator to indicate the creation of a link between the fields.

Based on the inputs received through the GUI 300, the corresponding link metadata structure 302 is generated by the web application 110. The link metadata structure 302 includes descriptions of each of the fields to be linked. For example, the CustomerID link field is described with a "Label" parameter that corresponds to the CustomerID parent field 312, a "Virtual" parameter that corresponds to a selection state of the selection box 314, a "LinkID" that identifies a name 320 of the link metadata structure 302, and a "LinkFieldName" parameter that corresponds to the child label 316. The link metadata structure 302 also includes a "ChildID" parameter 322 and a "ParentID" parameter 324 that correspond to identifiers of the child application data element 306 and parent application data element 304, respectively. That is, the parameter value of the "ChildID" parameter 322 is the identifier 208 of the child application data element 306. Likewise, the parameter value of the "ParentID" parameter 324 is the identifier 208 of the parent application data element 304.

Upon the creation of the link metadata structure 302, the web application 110 sends the link metadata structure 302 to the web service 114 through the REST API 116 call. The web service 114 then stores the link metadata structure 302 in the metadata database 122.

Figure 4:
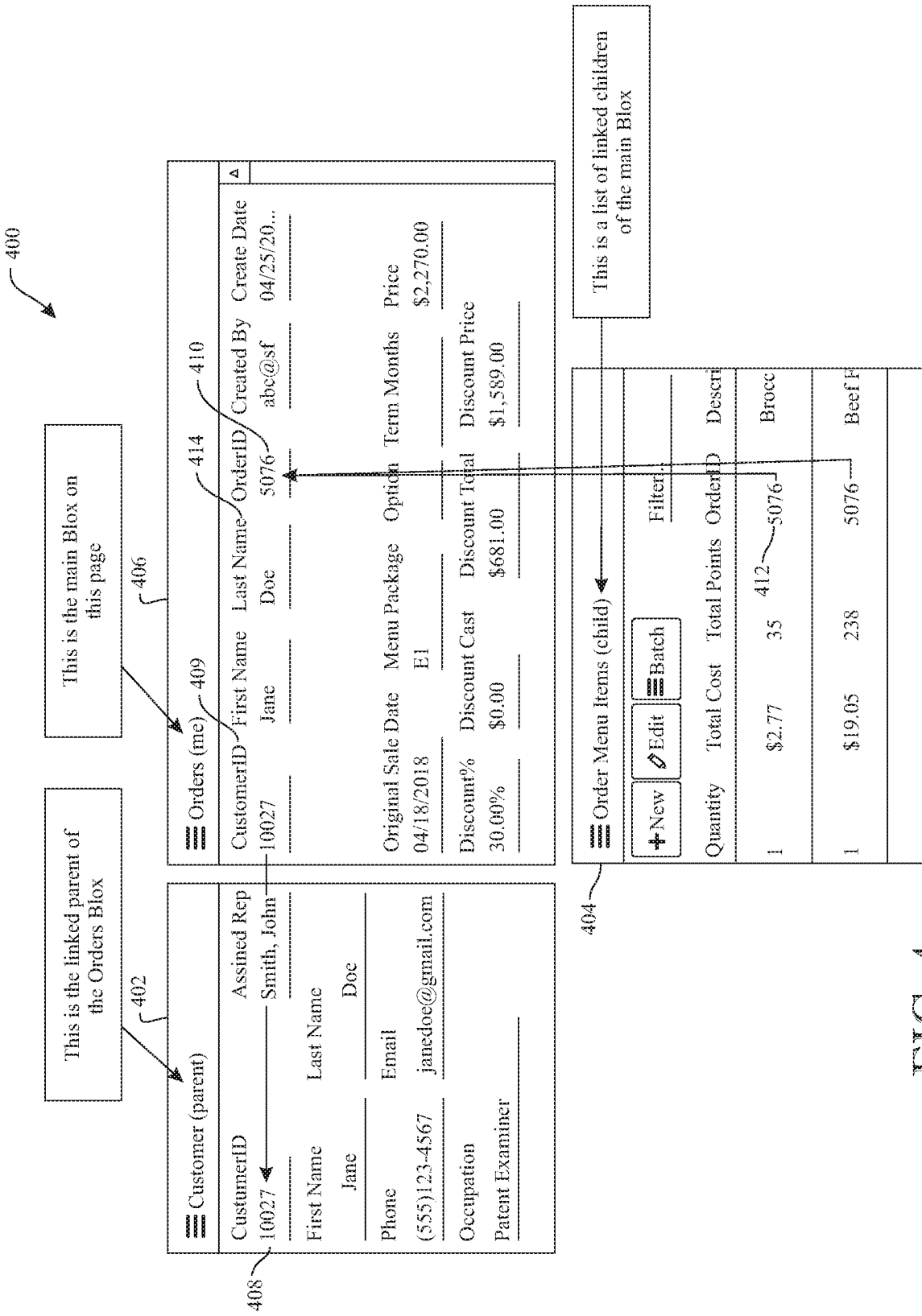
FIG. 4 illustrates an example graphical user interface showing parent and child application data elements of a selected application data element.

The illustration of FIG. 4 illustrates an example GUI 400 showing parent 402 and child 404 application data elements of a selected application data element 406. For example, upon the user 106 navigating the browser 102 to view the selected application data element 406, corresponding parent and child application data elements 402, 404 are shown in response. As described above, various fields may be linked from parent to child application data elements. For example, the CustomerID value 408 specified in the Customer application data element 402 is linked to the corresponding CustomerID field 409 in the Orders application data element 406. Likewise, the OrderID field 410 in the Orders application data element 406 is linked to the corresponding OrderID field 412 in each of the child Order Menu Items application data elements 404. As there is a one-to-many relationship between the OrderID application data element 406 and the Order Menu Items application data elements 404, the Order Menu Items application data elements 404 are shown in a list. One or more visual indicators 414 may be provided adjacent to each field of an application data element to indicate that the field is a linked field.

Such linking facilitates building out complex behaviors and hierarchical relationships through simple and intuitive point-and-click user interfaces. Additionally, the linking allows for cascading changes to data. For example, should Jane Doe decide to change her name to Janice Doe, only the Customer application data element 402 would need to be updated. By virtue of the links between the Customer application data element 402 and the Orders application data element 406, the change in name would propagate across the application data elements without requiring any recompiling of software code. Similarly, the application data elements and links themselves may be modified at runtime without requiring any recompiling of software code because the edits would be reflected by changes in the metadata structures in the metadata database 122 and not in any of the underlying code elements.

Figure 5:
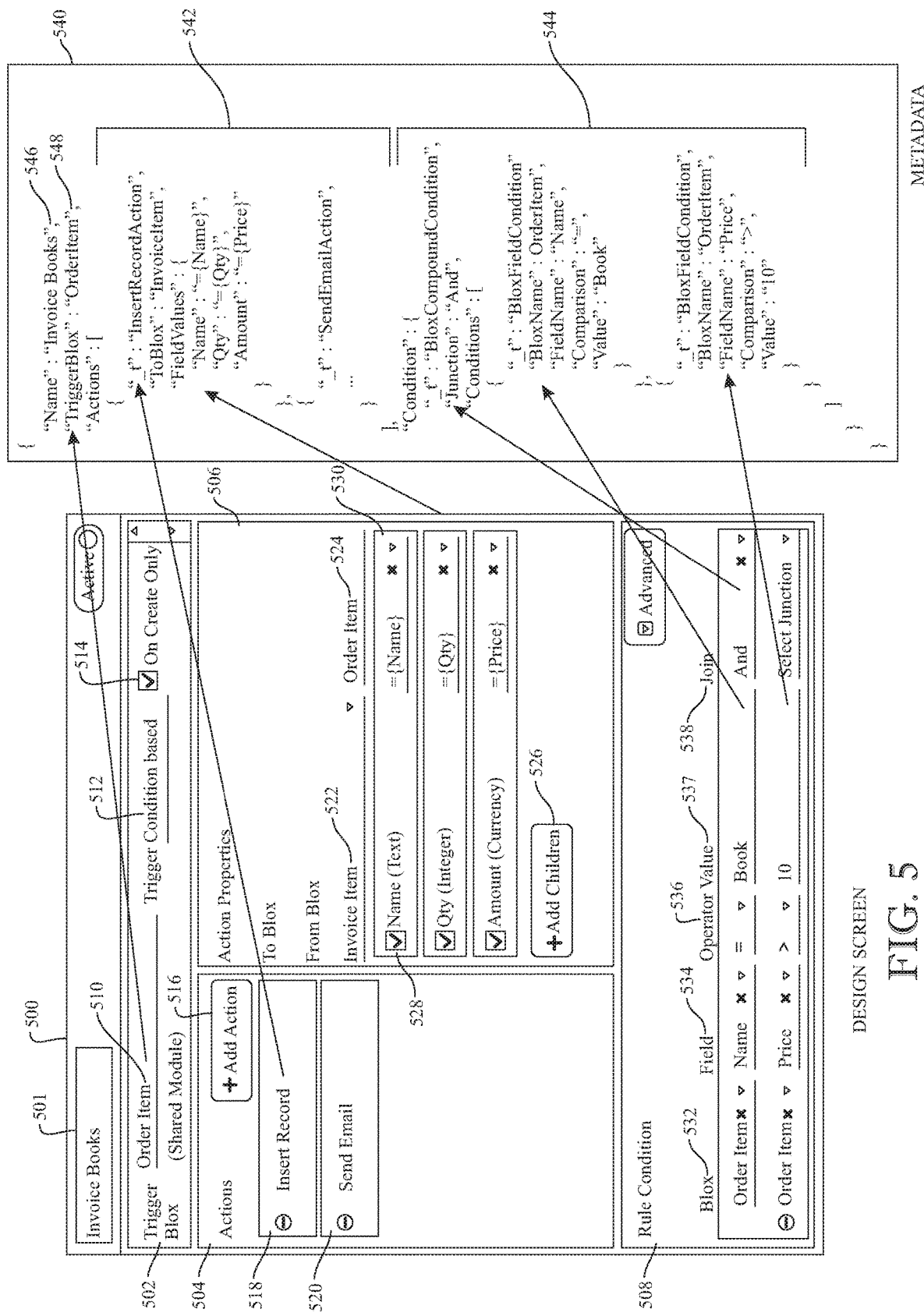
FIG. 5 illustrates an example graphical user interface for defining rules for action(s) to automatically trigger in response to events according to one implementation.

The illustration of FIG. 5 illustrates an example GUI 500 for defining rules for action(s) to automatically trigger in response to events according to one implementation. As discussed above, the event may include time- or data-based events. The time events are published to the event bus 124 upon meeting a time condition. Data-based events are published to the event bus upon a data value being updated (e.g., a value of a field of an application data element is changed) or a new data element being created (e.g., a new instance of an application data element Is input to the programming development environment 100 through the browser 102).

The GUI 500 includes a rule name 501, a trigger section 502, an action section 504, an action properties section 506, and a rule condition section 508. The trigger section 502 includes a triggering application data element field 510 for identifying a triggering application data element. The trigger section 502 also includes a trigger field 512 for specifying a type of triggering event (e.g., time-base or data-driven). In the example shown, the rule name 501 is Invoice Books, the triggering application data element 510 is OrderItem, and the trigger 512 is a condition based trigger for triggering execution of the rule upon meeting the condition. A check box 514 on the GUI 500 in the trigger section 502 is selectable for application of the rule only upon creation of the triggering application data element 510 (as opposed to upon any updates to the triggering application data element 510). Therefore, the rule shown in FIG. 5 is for manipulating an invoice upon the creation of an order item.

The type of manipulation performed by the rule is specified in the actions section 504 of the GUI 500. A new action may be added to the rule upon selection of an add action button 516. In the example show, a send e-mail action 520 and an insert record action 518 are included in the rule. The send e-mail action 520 may trigger sending an e-mail copy of an invoice or other notification e-mail upon creation of a new order item. Other actions may be added as needed. New actions may be developed and plugged into the programming development environment 100 as needed. Some additional actions may include an action to Send Email, Show Popup Message, Insert Record, Insert Record Hierarchy (parent-child), Update Record, Attach Document from Template, Create Workflow, or Insert Task into Workflow. This list of actions is provided as an example and does not represent exhaustive list of actions that can be performed.

The action properties section 506 specifies properties for a selected action. In the example shown, the action properties section 506 shows the properties for the insert record action 518. The action properties section 506 includes a To field 522 for specifying an application data element to which the record is to be inserted and a From field 524 for specifying an application data element from which the values of the inserted record are obtained. An Add Children button 526 is selectable for specifying additional child fields of the application data element identified in the To field 522 to be populated. Upon adding a child field, such as the Name field 528, a drop-down menu 530 may be selected to specify a field from the application data element identified in the From field 524 whose value is used to populate the child field 528. In some implementations, the drop-down menu 530 may only show fields of a corresponding data type to the child field 528. For example, the Name child field 528 is a text data type. Therefore, the drop-down menu 530 may only show other text data fields from the application data element identified in the From field 524. In some implementations, the action properties section 506 may also defined one or more expressions for evaluating field values.

The condition for triggering the rule is specified in the rule condition section 504 of the GUI 500. The rule condition section 504 includes a condition application data element input 532, a condition field input 534, an operator input 536, a value input 537, and a join input 538. The condition application data element input 532 specifies an application data element against which the condition is evaluated, for example the OrderItem application data element. The condition field input 534 specifies a field of the condition application data element input 532 to be evaluated, such as the Name field. The operator input 536 specifies a type of operation (e.g., mathematical operator such as +, −, =, >, <, *, /, etc.) to be performed in evaluating the condition. The value input 537 specifies a value of the condition field input 534 against which the operator input 536 is evaluated. For example, the first condition specified in the rule condition section 504 is that the Name field of the OrderItem application data element has a value equal to Book.

Compound conditions may be generated through the rule condition section 504 through the join input 538. The join input 538 may be selected to perform a Boolean function for joining multiple conditions. The second condition specified in the rule condition section 504 is that the Price of the OrderItem application data element is greater than 10. In the example shown, the join input 538 is set to perform an And function to require both of the specified conditions to be performed in order to initiate performance of the actions specified in the actions section 504.

Based on the inputs received through the GUI 500, the corresponding rule metadata structure 540 is generated by the web application 110. As with the GUI 500, the rule metadata structure 540 includes an actions section 542 and a conditions section 544 with metadata descriptions (e.g., nested parameter and parameter value descriptions) of each of the inputs provided through GUI 500. The rule metadata structure 540 also includes a metadata description of the rule name 501 as shown at 546 as well as a metadata description of the triggering application data element 510 as shown at 548.

Upon the creation of the rule metadata structure 540, the web application 110 sends the rule metadata structure 540 to the web service 114 through the REST API 116 call. The web service 114 then stores the link metadata structure 302 in the metadata database 122. In the examples provided above with reference to FIGS. 2, 3, and 5, the web application 110 is described as creating the metadata structures for the application data elements, links, and rules. In some implementations, the web application 110 may simply pass inputs received from the GUIs 200, 300, 500 to the web service 114 through the REST API 116. The web service 114 may then create the metadata structures described above and store them in the metadata database 122.

Figure 6:
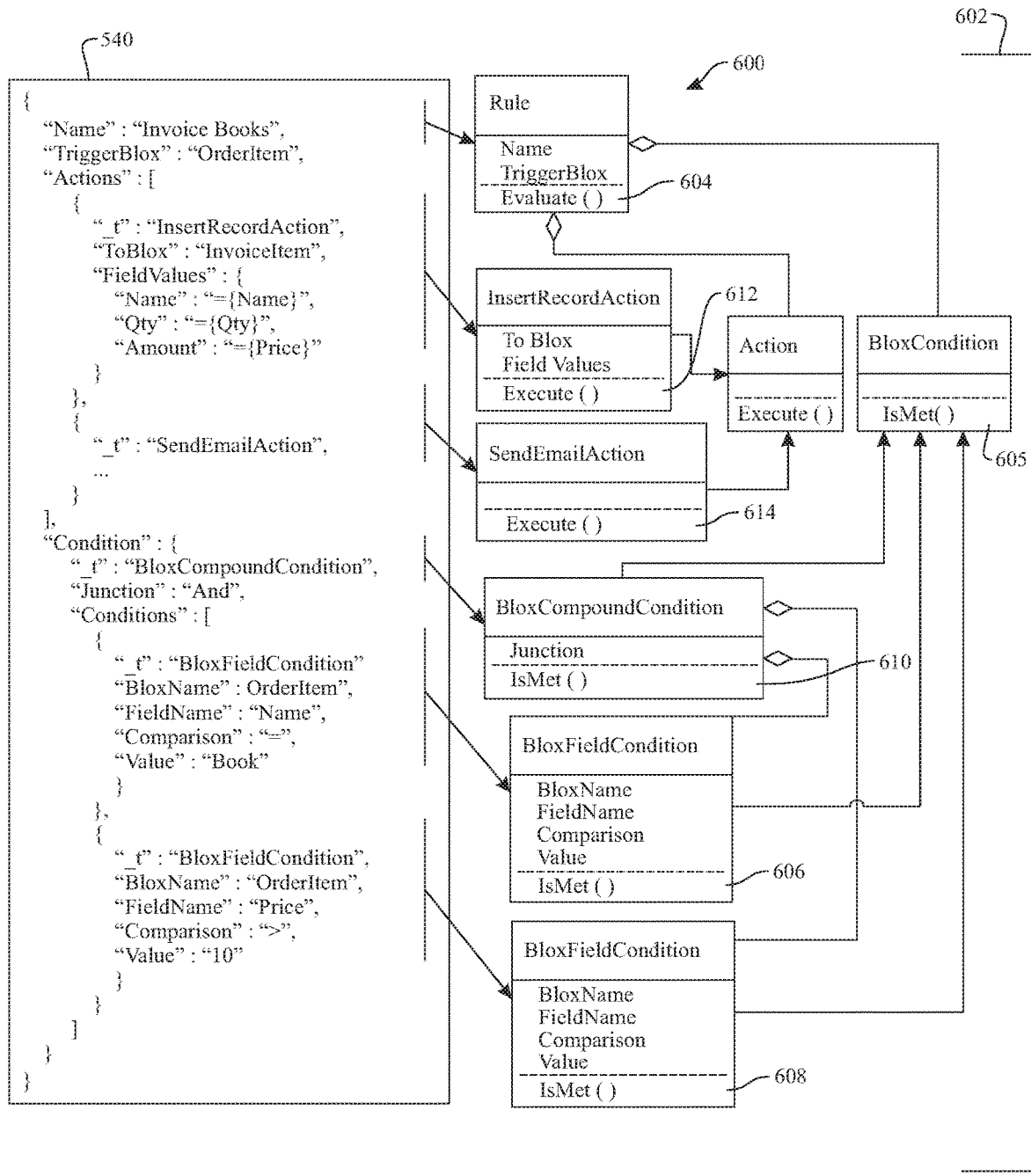
FIG. 6 illustrates an example rule evaluation process for dynamically generating programmatic code elements for implementing the rule according to one implementation.

The illustration of FIG. 6 illustrates an example rule evaluation process 600 for dynamically generating programmatic code elements for implementing the rule according to one implementation. As described above with reference to FIG. 1C, as events are received by the event bus 124, they are distributed to a Rule Handler 126 for processing. The Rule Handler 126 retrieves metadata structures from the metadata database 122 that correspond to the event. The metadata database 122 returns the metadata structures from the metadata database 122 to the Rule Handler 126. Upon receiving the returned metadata structures associated with the event from the metadata database 122, the Rule Handler 126 parses the metadata structure(s). Based on the parsed metadata structure(s), the Rule Handler 126 automatically generates code elements to manage data and implement functions described in the retrieved metadata structure(s).

The example of FIG. 6 shows how the rule defined in the example of FIG. 5 is evaluated upon a data-based event of creation of an OrderItem application data element is published to the event bus 124. An example of a structure of this event as published on the event bus 124 is provided below:

```
{
Type=BloxModified,
BloxName="OrderItem",
BloxId=4021a86d-c10a-4b5f-847b-000c36d3ad5c,
UpdatedFields=
[
BloxField
{
Name="Name",
Type=Text,
Value="Book"
},
BloxField
{
Name="DefaultValue",
Type=Currency,
Value=10
}
]
}
```

Therefore, the Rule Handler 126 receives the event of the created OrderItem application data element and retrieves all of the rules from the metadata database 122 where the triggering application data element field 510 specifies the OrderItem application data element. For example, the Rule Handler 126 retrieves the rule metadata structure 540 from the metadata database 122 upon receiving the above event. The Rule Handler 126 parses the rule metadata structure 540 into a software code object hierarchy 602 shown in FIG. 6. The software code object hierarchy references one or more pre-compiled methods of software code maintained by the Rule Handler 126. For example, the Rule Handler 126 maintains pre-compiled C # methods including an Evaluate( ) method, an IsMet( ) method, and an Execute( ) method, among others. The Rule Handler 126 then calls the Evaluate( ) method 604 for each of the retrieved rules. In the Evaluate( ) method 604 shown in FIG. 6, the Rule Handler 126 additionally call the IsMet( ) method 605 on the Condition. Likewise, the BloxCompoundCondition calls the IsMet( ) method 610 on both of the BloxFieldConditions. Each BloxFieldCondition calls the IsMet( ) method 606, 608 to compare the value from the fields in the event to its own value 537 using the specified operator 536 and returns the result to the BloxCompoundCondition. The BloxCompoundCondition uses the obtained results from the two BloxFieldConditions with its join input 538 (an And in this example) and returns the result. If the result of the BloxCondition is False, the Rule Handler 126 stops processing the event. Otherwise, the conditions of the rule are met (e.g., BloxCondition is True) and the Rule Handler 126 loops through its Actions and calls an Execute( ) method 612, 614 on each. As discussed above, the InsertRecordAction inserts an "Invoice Item" record with field values copied from "Order Item". The SendEmailAction sends a confirmation email to a destination with content as specified in its action properties 506. In sending the confirmation e-mail the Rule Handler 126 may communicate with an exchange server or other system external to the programming development environment 100. Upon completion of execution of the Actions, the Rule Handler 126 finishes processing of the event.

As noted above with reference to FIG. 1C, upon processing an event, one or more application data items may be updated or created, thereby producing additional events to be published to the event bus 124 for processing. Additionally, while a data-based event is described above, time-based events may be published to the event bus 124 as well. In some implementations, a value of a field in an application data element may have a time-based dependency such that the value changes over time. In such cases, a data-based event of the updated value may be published to the event bus 124. Other additions or variations of the processing of events on the event bus 124 are contemplated by this disclosure.

Figure 7:
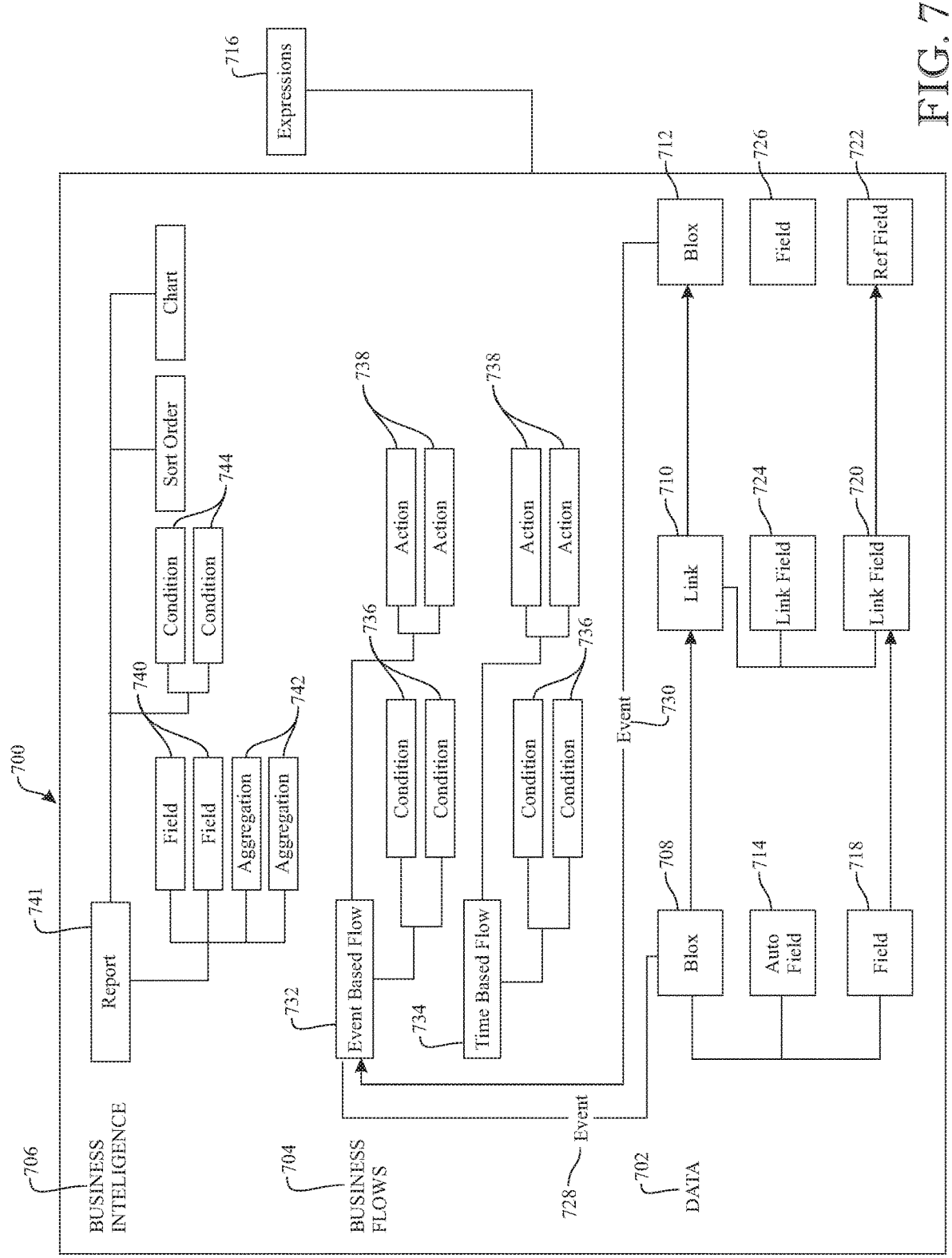
FIG. 7 illustrates a logical diagram of the programming development environment according to one implementation.

The illustration of FIG. 7 illustrates a logical diagram 700 of the programming development environment 100 according to one implementation. The logic diagram 700 includes a data logic section 702, a business flow logic section 704, and a business intelligence logic section 706. The data logic section 702 includes a parent application data element 708, a link metadata structure 710, and a child application data element 712. The parent application data element 708 includes a field 714 with a value that is automatically calculated by an expression 716 and a field 718 with a user-entered value. The link metadata structure 710 includes a link field that links the value of the field 718 in the parent application data element 708 to a reference field 722 in the child application data element 712. The link metadata structure 710 also may include one or more other link fields 724 to a different parent application data element (not shown). The child application data element 712 includes the reference field 722 and may additionally include one or more additional fields 726, such as additional user-entered fields or fields that are evaluated with an expression 716. As the parent application data element 708 is created or updated, an event 728 is generated. Likewise, as the child application data element 712 is created or updated, an event 730 is generated.

The business flow logic section 704 includes an event based flow 732 for receiving and processing the data-driven events 728, 730 and a time based flow 734 for processing time-based events. Each flow 732, 734 includes one or more conditions 736 and one or more actions 738 to be executed upon meeting all of the conditions of the respective flow.

The business intelligence logic section 706 includes a report 741 with one or more fields 740 from application data elements and/or one or more aggregations 742 from a plurality of application data elements (e.g., a sum or average of a field across all child application data elements). Generation of the report 741 may be conditioned on one or more conditions 744. The report may also have a sort order 746 and a chart 748.

Figure 8:
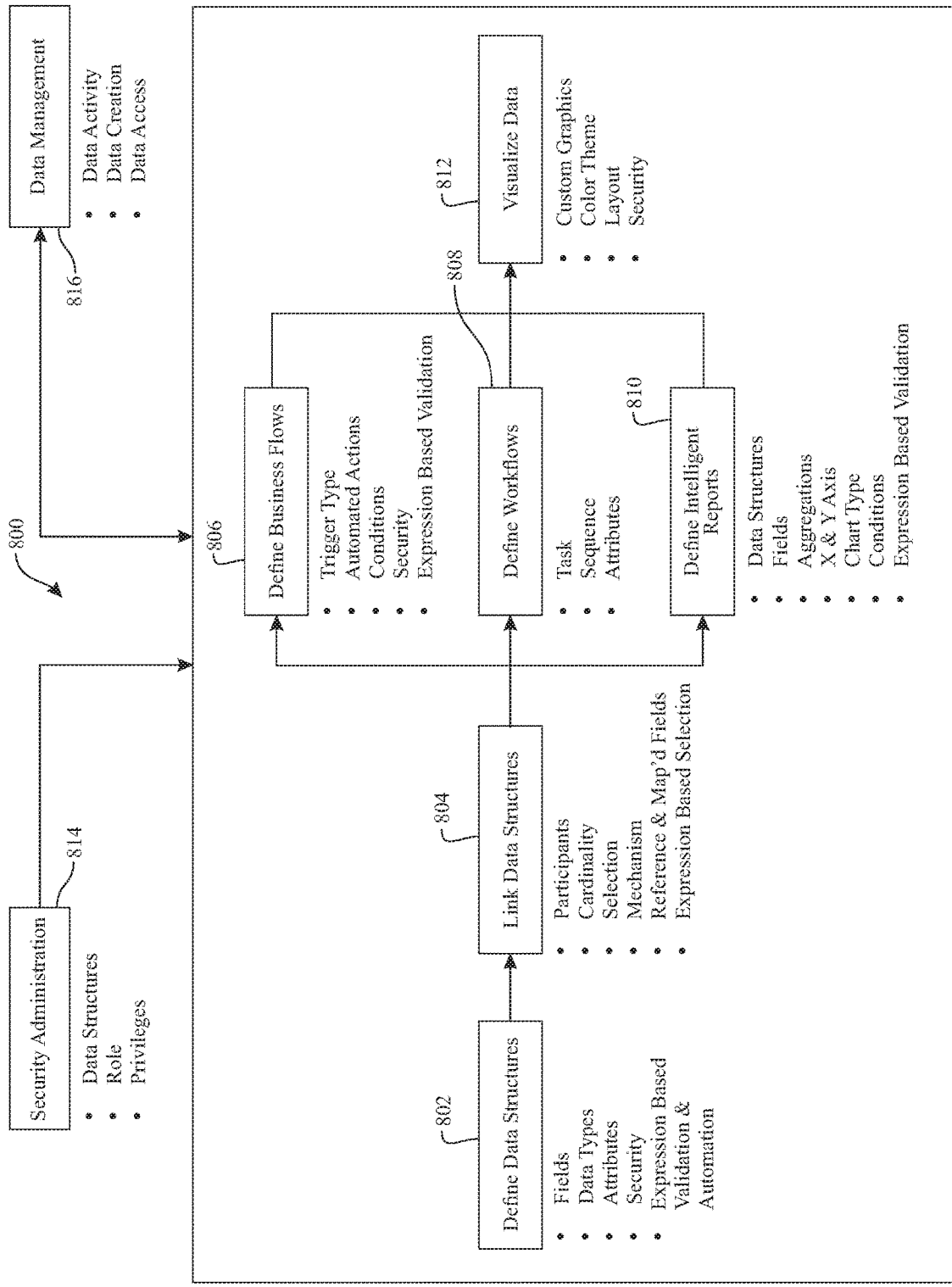
FIG. 8 illustrates an application design process for generating an application with the programming development environment according to one implementation.

The illustration of FIG. 8 illustrates an application design process 800 for generating an application with the programming development environment 100 according to one implementation. The application design process 800 includes defining data structures 802 (e.g., application data elements) for the application. As described above in conjunction with FIG. 3, defining the data structures 802 includes defining the fields, data types, attributes, security, and expression-based validation, calculation, and automation. At 804, link data structures are defined, such as described above in conjunction with FIGS. 4-5, including identifying parent and child application data elements, cardinality, selection mechanisms, reference and mapped fields, as well as expression-based selection. At 806, business process flows are defined, such as described above in conjunction with FIG. 6, including identifying types of triggers, automated actions, conditions, security, and expression-based validation. At 808, workflows are defined, including identifying tasks, sequences, and attributes of the workflow. At 810, reports are defined, including identifying application data structures and fields for populating the report, aggregations across fields and application data structures, X & Y axis field selections, chart type selections, conditions for report generation, and expression-based validation. Each of 806, 808, and 810 may be performed in any order. At 812, application visualizations are defined including creation or importing of custom graphics, selection of color themes, layout definitions, and security restrictions.

The application design process 800 may additionally include defining security administration features 814, such as security data structures, roles, and privileges. The application design process 800 may also include establishing data management practices 816 for the application, such as monitoring and logging data activity, data creation, and data access.

It should be appreciated that the logical operations described herein with respect to the various figures may be implemented (1) as a sequence of computer implemented acts or program modules (i.e., software) running on a computing device (e.g., the computing device described in FIG. 9), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 9:
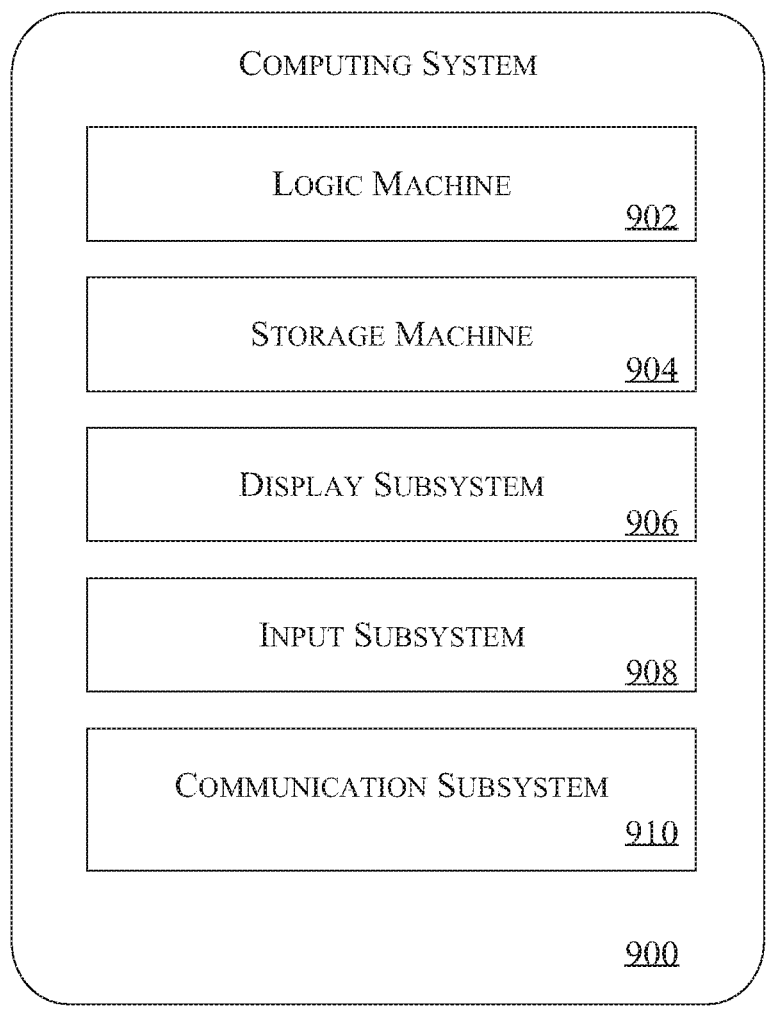
FIG. 9 illustrates an exemplary computer system suitable for implementing the several embodiments of the disclosure.

Referring to FIG. 9, an example computing device 900 upon which embodiments of the invention may be implemented is illustrated. For example, each of the web application 110, web service 114, event bus 124, and Rule Handler 126 described herein may each be implemented as a computing device, such as computing device 900. It should be understood that the example computing device 900 is only one example of a suitable computing environment upon which embodiments of the invention may be implemented. Optionally, the computing device 900 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 900 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 900 to provide the functionality of a number of servers that is not directly bound to the number of computers in the computing device 900. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 900 typically includes at least one processing unit 902 and system memory 904. Depending on the exact configuration and type of computing device, system memory 904 may be volatile (such as random access memory (RAM)), non-volatile (such as read-only memory (ROM), flash memory, etc.), or some combination of the two. The processing unit 902 may be a standard programmable processor that performs arithmetic and logic operations necessary for operation of the computing device 900. While only one processing unit 902 is shown, multiple processors may be present. Thus, while instructions may be discussed as executed by a processor, the instructions may be executed simultaneously, serially, or otherwise executed by one or multiple processors. The computing device 900 may also include a bus or other communication mechanism for communicating information among various components of the computing device 900.

Computing device 900 may have additional features/functionality. For example, computing device 900 may include additional storage such as removable storage and non-removable storage including, but not limited to, magnetic or optical disks or tapes. Computing device 900 may also contain network connection(s) in a communication subsystem 910 that allow the device to communicate with other devices such as over the communication pathways described herein. The network connection(s) may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 900 may also have input device(s) 908 such as keyboards, keypads, switches, dials, mice, track balls, touch screens, voice recognizers, card readers, paper tape readers, or other well-known input devices. Output device(s) in a display subsystem 906 such as a printers, video monitors, liquid crystal displays (LCDs), touch screen displays, displays, speakers, etc. may also be included. The additional devices may be connected to the bus in order to facilitate communication of data among the components of the computing device 900. All these devices are well known in the art and need not be discussed at length here.

The processing unit 902 may be configured to execute program code encoded in tangible, computer-readable media. Tangible, computer-readable media refers to any media that is capable of providing data that causes the computing device 900 (i.e., a machine) to operate in a particular fashion. Various computer-readable media may be utilized to provide instructions to the processing unit 902 for execution. Example tangible, computer-readable media may include, but is not limited to, volatile media, non-volatile media, removable media and non-removable media implemented in any method or technology for storage of information such as computer readable instructions, data structures, program modules or other data. System memory 904, removable storage, and non-removable storage are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 902 may execute program code stored in the system memory 904. For example, the bus may carry data to the system memory 904, from which the processing unit 902 receives and executes instructions. The data received by the system memory 904 may optionally be stored on the removable storage or the non-removable storage before or after execution by the processing unit 902.

In other words, in some embodiments the methods, tasks, processes, and/or operations described above may be effected, executed, actualized, and/or carried out by a computing system including a tangible computer-readable storage medium, also described herein as a storage machine, that holds machine-readable instructions executable by a logic machine (i.e. a processor or programmable control device) to effect, execute, actualize, carry out, provide, implement, perform, and/or enact the above described methods, processes, operations, and/or tasks. For example, a suitable computing system may be computing system 900 shown in FIG. 9. When such methods, operations, and/or processes are implemented, the state of the storage machine 904 may be changed to hold different data. For example, the storage machine 904 may include memory devices such as various hard disk drives, CD, or DVD devices. The logic machine 902 may execute machine-readable instructions via one or more physical information and/or logic processing devices. For example, the logic machine 902 may be configured to execute instructions to perform tasks for a computer program. The logic machine 902 may include one or more processors to execute the machine-readable instructions. The computing system 900 may include a display subsystem 906 to display a graphical user interface (GUI) or any visual element of the methods or processes described above. For example, the display subsystem 906, storage machine 904, and logic machine 902 may be integrated such that the above method may be executed while visual elements of the disclosed system and/or method are displayed on a display screen for user consumption. The computing system 900 may include an input subsystem 908 that receives user input. The input subsystem 908 may be configured to connect to and receive input from devices such as a mouse, keyboard or gaming controller. For example, a user input may indicate a request that a certain task is to be executed by the computing system 900, such as requesting the computing system 900 to display any of the above described information, or requesting that the user input updates or modifies existing stored information for processing. A communication subsystem 910 may allow the methods described above to be executed or provided over a computer network. For example, the communication subsystem 910 may be configured to enable the computing system 900 to communicate with a plurality of personal computing devices. The communication subsystem 910 may include wired and/or wireless communication devices to facilitate networked communication. The described methods or processes may be executed, provided, or implemented for a user or one or more computing devices via a computer-program product such as via an application programming interface (API).

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Recited below is alternative language to facilitate understanding of the invention.

Intelligent data flow (numbered steps):

1. A user requests data to be retrieved via HTTP REST API. The API abstracts complexity of the underlying data structures and relationships allowing user to focus on simple data records and forms. This is shown in FIG. 4 which is an illustration of typical user experience.

2. Platform web service dynamically generates SQL queries based on data elements requested and additional search criteria.

3. Platform web service submits SQL queries to a database server and sends results back to user.

4. A user updates retrieved data.

5. A user submits data to be updated via HTTP RESTful API.

6. A web service retrieves metadata structures relevant to the data being updated from a NoSQL storage location.

7. Expressions defined in the metadata are used to dynamically generate C # code elements. Expressions are described further below.

8. Dynamically generated C # code elements are used to automatically calculate derived data values to supplement data submitted by a user.

9. Dynamically generated C # code elements are used to automatically validate data submitted by a user.

10. SQL update statement is dynamically generated based on metadata content.

11. SQL updated statement is submitted and processed on a database server.

12. An event with updated values is generated and submitted to a highly scalable, distributed event bus.

13. Event bus distributes the event to one of many event processing engines (running on a cluster of dedicated virtual machines) using a standard load balancing algorithm.

14. Event processing engine retrieves metadata structures specifying rules/behavior to be triggered by specific type of event. Details of this process are explained further below.

15. Event processing engine dynamically generates C # code elements.

16. C # code elements applies conditions and translations to the event producing new data elements.

17. C # code may retrieve additional data from database using dynamically generated SQL code.

18. C # code may perform database updates using dynamically generated SQL code.

19. C # code may communicate with external systems and submit dynamically generated requests (e.g. Web APIs, email servers).

Metadata

All aspects of the platform operations are controlled by Metadata. Metadata defines user data structures ("Blox Definitions") and logic behind business flows ("Rules"). Metadata is created by application designers using a simple to use, point and click Graphical User Interface (GUI). An illustration of GUI component and corresponding Metadata element for a simple Rule is presented in FIG. 5. Metadata is stored in JSON format in several NoSQL database data collections. Each user application ("account") has its own set of Metadata. Sections below outline and briefly describe the major metadata components.

Blox Definitions

Blox Definitions define static structure of application data elements. They consist of fields representing individual values along with their types (e.g. text vs. numeric) and attributes. Attributes define additional characteristic of data fields. For example, they may specify initial value or define a validation condition. FIG. 2 shows a Blox Definition illustration.

Blox Links

Blox Links represent hierarchical relationships between Blox Definitions. Each link has a parent and child Blox along with link cardinality (one-to-many vs. many-to-many). In addition, it has attributes defining how a link is visually established and represented in the application GUI. FIG. 3 illustrates a Blox Link.

Rules

Rules represent dynamic behavior of the application specifying system actions (e.g. updating another data record or sending email) automatically triggered in response to user activity based on specified Boolean logic conditions.

Workflows

Workflows represent business processes that involve tasks performed by users and specify series of tasks and their dependencies. Completion of all task dependencies "activates" tasks and allows workflow to continue.

Reports

Reports allow the visualization of data coming from different Blox Definitions leveraging its relationships defined via Blox Links. Reports consist of fields to be presented and filters to restrict the data set. Numeric fields can be aggregated together (e.g. sum, average, maximum, minimum) based on other member fields on the report. Reports allow the specification of chart attributes defining how reports can be visualized in a graphical fashion.

Code Generation

At runtime a relevant portion of Metadata is retrieved and its JSON structure is parsed creating a hierarchy of objects. Each object belongs to a C # class that defines its structure and behavior. A class used for a particular JSON element is chosen based on a position in JSON structure, name of a property and optionally a special "_t" parameter. An example of this process for a simple Rule is illustrated in FIG. 6. CodeBlox software relies heavily on an object-oriented programming concept of inheritance. It allows to define a common interface accessible to the outside world for a series of different object classes. This way an external object can implement a generic logic for all elements sharing the same interface without any concern for the specifics of their behavior. It allows to create complex behaviors out of a series of simple building blocks.

A rule "Action" is an example of this concept. A Rule has a list of different actions as defined by an application designer. In the example below these are "InsertRecord" and "SendEmail" actions. Both implement an Execute( ) method that is invoked for each action during rule evaluation. A rule can just loop through its actions and call the Execute( ) method on each without any concern for different behaviors they produce. "Condition" is another example with its IsMet( ) method. Both BloxFieldCondition and BloxCompoundCondition implement this method in a different way allowing to produce complex rule Boolean logic evaluation criteria out of two simple components.

Rule Evaluation

This section outlines a pseudocode illustrating a simple rule evaluation. Rules are initiated by events generated when users perform actions such as updating a data record. The platform posts all events to an event bus. A special process called Rule Handler receives events from the bus and processes them accordingly. Events contain information about the record being updated: Blox Name, Unique ID, and new field values. An example event representing an update to an "OrderItem" blox is presented below.

```
{
Type=BloxModified,
BloxName="OrderItem",
BloxId=4021a86d-c10a-4b5f-847b-000c36d3ad5c,
UpdatedFields=
[
BloxField
{
Name="Name",
Type=Text,
Value="Book"
},
BloxField
{
Name="DefaultValue",
Type=Currency,
Value=10
}
]
}
```

Step-by-Step Rule Evaluation Process

1. Rule Handler receives an event
2. Rule Handler retrieves all rules from NoSQL database with corresponding TriggerBlox and parses them into software code object hierarchy as described above.
3. Rule Handler calls Evaluate( ) method on each rule.
4. In Evalute( ) method Rule calls IsMet( ) method on its Condition.
5. BloxCompoundCondtion condition calls IsMet( ) method on both of its BloxFieldConditions.
6. BloxFieldCondition compares the value of the updated field (from Event) to its own Value using specified Comparator (e.g. =, <, >) and returns the result.
7. BloxCompoundCondition uses both obtained results applying its logic operation (Junction) and returns the result.
8. If result is FALSE the Rule completes.
9. Otherwise Rule loops through its Actions and calls Execute( ) method on each.
10. InserRecordAction inserts an "Invoice Item" record with values copied from "Order Item".
11. SendEmailAction sends confirmation email with destination and content as specified in its properties.
12. The Rule completes.

Expressions

Expressions allow application designers to specify how certain values are dynamically calculated during runtime. For example, they can be used in the following scenarios:

To automatically calculate a value of a blox field.

To provide dynamically calculated values to condition elements.

To apply calculated values to Rule Action attributes.

An expression uses a complex compiler that will parse it into a hierarchical expression structure and evaluate in a recursive manner. Expressions use a proprietary notation allowing designer to specify the following elements:

Reference value of another Blox field (including values from other, linked Blox Definition).

Use mathematical formulas and common operators.

Use logical functions (e.g. AND, OR).

Use functions manipulating text values (e.g. substring, uppercase conversion).

Use functions manipulating date values (e.g. time difference between 2 dates).

Use functions calculating aggregate formulas on all record "children" (e.g. average, sum).

Use common financial functions (e.g. NPV, IIR).

Example Expression

=DATEDIFF(day, {End Date}, 11/17/2017)

This expression will calculate a difference between date "11/17/2017" and date value of a field "End Date" expressed in days.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system providing a graphical user interface-based application development environment, comprising:
   one or more processors;
   a memory coupled with the one or more processors having instructions stored therein;
   a metadata database configured to store an application data element in a data serialization format, wherein the application data element comprises a plurality of data fields that each represent an individual value, wherein each data field has a label, a data type, and one or more attributes;
   a web service configured to receive an updated value for a data element, wherein the web service is further configured to retrieve the application data element from the metadata database based on the data element corresponding to a first data field of the plurality of data fields, and wherein the web service is further configured to parse the application data element to update a value of the first data field with the updated value of the data element;
   a relational database of user data configured to store the data element in a table, wherein the web service is configured to automatically generate an update statement to update the data element in the table with the updated value; and
   wherein metadata is stored in a dedicated repository with user specified attributes to dynamically arrange software code to manage data and perform enterprise application functions in a fully automated fashion;
   wherein metadata allows users to describe structure of data elements, relationships between data elements, and rich behavior that drives data manipulation and interacts with a digital environment through a variety of interfaces;
   wherein a set of backend processing elements convert metadata in real-time into user-defined behavior;
   wherein the system is configured to integrate with third-party systems and/or hosted environments; and
   wherein an intelligent data flow includes the following steps:
   a user requests data to be retrieved via HTTP REST API, the API abstracting complexity of underlying data structures and relationships,
   a platform web service dynamically generates SQL queries based on data elements requested and additional search criteria, and the platform web service submits SQL queries to a database server and sends results back to the user,
   the user updates retrieved data,
   the user submits data to be updated via HTTP RESTful API,
   a web service retrieves metadata structures relevant to the data being updated from a NoSQL storage location,
   expressions defined in the metadata are used to dynamically generate C # code elements,
   dynamically generated C # code elements are used to automatically calculate derived data values to supplement data submitted by the user,
   dynamically generated C # code elements are used to automatically validate data submitted by the user,
   an SQL update statement is dynamically generated based on metadata content, and the SQL updated statement is submitted and processed on h database server,
   an event with updated values is generated and submitted to a scalable, distributed event bus,
   the event bus distributes the event to one of many event processing engines running on a cluster of dedicated virtual machines using a standard load balancing algorithm,
   an event processing engine retrieves metadata structures specifying rules/behavior to be triggered by a specific type of event,
   the event processing engine dynamically generates C # code elements,
   the C # code elements apply conditions and translations to the event producing new data elements,
   the C # code elements retrieves additional data from a database using dynamically generated SQL code,
   the C # code elements performs database updates using dynamically generated SQL code, and
   the C # code elements communicates with external systems and submits dynamically generated requests.

2. The system providing a graphical user interface-based application development environment of claim 1, wherein all platform operations are controlled by metadata, the metadata defining user data structures and logic behind business flows, wherein metadata is created by a user using a simplified point and click Graphical User interface without the user being skilled in programming language; wherein the metadata is stored in JSON format in several NoSQL database data collections, and wherein one or more user application accounts each have their own set of metadata.

3. The system providing a graphical user interface-based application development environment of claim 1, wherein the environment is configured to generate blox definitions defined as static structures of application data elements, the blox definitions consisting of fields representing individual values along with their types and attributes, wherein attributes define additional characteristics of data fields, the attributes being configured to specify an initial value and/or a validation condition.

4. The system providing a graphical user interface-based application development environment of claim 1, wherein the environment is configured to generate blox links defined as representations of hierarchical relationships between user data structures, each blox link being configured to have a parent child data structure along with link cardinality, and the blox link being configured to have attributes defining how a link is visually established and represented in a GU.

5. The system providing a graphical user interface-based application development environment of claim 1, wherein the environment is configured to generate rules that represent dynamic behavior of application specifying system actions, the application specifying system actions being configured to update another data record or sending email, the application specifying system actions being automatically triggered in response to user activity based on specified Boolean logic conditions.

6. The system providing a graphical user interface-based application development environment of claim 1, wherein the environment is configured to generate workflows representing business processes that involve tasks performed by users and configured to specify series of tasks and their dependencies, wherein completion of all task dependencies activate tasks and allow workflows to continue.

7. The system providing a graphical user interface-based application development environment of claim 1, wherein the environment is configured to generate reports that visualize data coming from user data structures, leveraging relationships defined by hierarchical relationships between user data structures, wherein reports include fields to be presented and filters to restrict a data set, and wherein numeric fields of reports are configured to be aggregated based on other fields in a report.

8. The system providing a graphical user interface-based application development environment of claim 1, wherein at runtime a relevant portion of metadata is retrieved and its JSON structure is parsed to create a hierarchy of objects,
wherein each object belongs to a C # class that defines its structure and behavior, and wherein each class used for a particular JSON element is chosen based on a position in a JSON structure and a name of a property.

9. The system providing a graphical user interface-based application development environment of claim 1, wherein a rule evaluation process of the environment is configured to execute the steps of:

a rule handler receives an event,
the rule handler retrieves all rules from an NoSQL database with corresponding triggers and parses them into an software code object hierarchy,
the rule handler calls an Evaluate) method on each rule,
for the Evaluate( ) method a rule calls an IsMet( ) method on its condition,
a BloxCompoundCondtion condition calls IsMet( ) method on both of its BloxFieldConditions,
BloxFieldCondition compares a value of an updated field from an event to its own value using a specified comparator and returns a result,
a BloxCompoundCondition uses obtained results and applies its junction logic operation and returns a result,
if a result is FALSE the rule completes, and
otherwise the rule loops through its actions and calls the Execute( ) method on each.

10. The system providing a graphical user interface-based application development environment of claim 1, wherein expressions allow users to specify how certain values are dynamically calculated during runtime, wherein the expressions are used to:
automatically calculate a value of a field,
provide dynamically calculated values to condition elements, and
apply calculated values to rule action attributes,
wherein an expression uses a complex compiler parses it into a hierarchical expression structure and evaluates in a recursive manner,
wherein expressions use a proprietary notation allowing users to specify the following elements:
reference value of another field including values from other linked user data structures,
mathematical formulas and common operators,
logical functions, the logical functions being at least one of AND OR, functions manipulating text values, the text values being one of substring and uppercase conversion,
functions manipulating date value,
functions calculating aggregate formulas on all record children, and financial functions.

* * * * *